United States Patent
Kim et al.

(10) Patent No.: US 10,895,678 B2
(45) Date of Patent: Jan. 19, 2021

(54) WAVEGUIDE EDGE LIGHT SHIELDING COMPOSITION HAVING EXCELLENT ADHESIVE STRENGTH

(71) Applicant: LG Chem, Ltd., Seoul (KR)

(72) Inventors: Areum Kim, Daejeon (KR); Jaehyun Yoo, Daejeon (KR); Sungeun Park, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/488,387

(22) PCT Filed: Nov. 19, 2018

(86) PCT No.: PCT/KR2018/014192
§ 371 (c)(1),
(2) Date: Aug. 23, 2019

(87) PCT Pub. No.: WO2019/107817
PCT Pub. Date: Jun. 6, 2019

(65) Prior Publication Data
US 2020/0248016 A1 Aug. 6, 2020

(30) Foreign Application Priority Data
Nov. 28, 2017 (KR) .................. 10-2017-0160204

(51) Int. Cl.
*G02B 6/00* (2006.01)
*F21V 8/00* (2006.01)
*C09D 11/324* (2014.01)

(52) U.S. Cl.
CPC .......... *G02B 6/0011* (2013.01); *C09D 11/324* (2013.01)

(58) Field of Classification Search
CPC ... C09D 11/101; C09D 11/324; G02B 6/0011; G02B 27/01; G02B 27/0172
USPC .......................................... 259/630; 427/514
See application file for complete search history.

(Continued)

(56) References Cited

U.S. PATENT DOCUMENTS

| 6,348,118 B1 | 2/2002 | Johnson et al. |
| 6,860,600 B2 * | 3/2005 | Chen ...................... G02B 1/105 |
| | | 351/159.67 |

(Continued)

FOREIGN PATENT DOCUMENTS

| CN | 101472852 A | 7/2009 |
| CN | 102492330 A | 6/2012 |

(Continued)

OTHER PUBLICATIONS

International Search Report from Application No. PCT/KR2018/014192 dated Feb. 11, 2019, 2 pages.

(Continued)

*Primary Examiner* — Robert Tavlykaev
(74) *Attorney, Agent, or Firm* — Lerner, David, Littenberg, Krumholz & Mentlik, LLP

(57) ABSTRACT

An ultraviolet curable composition and a waveguide manufactured from the same are disclosed herein. In an embodiment, an ultraviolet curable composition for light shielding of a waveguide, comprises a colorant, an acrylate monomer, a urethane acrylate oligomer, an organosilane and a photopolymerization initiator, wherein adhesion between the cured composition and a glass substrate is 5B or greater by a ASTM D3359 standard and/or is 1,500 mN or greater by a microscratch test (MST).

17 Claims, 3 Drawing Sheets

(56) References Cited

U.S. PATENT DOCUMENTS

| | | | |
|---|---|---|---|
| 8,189,263 B1* | 5/2012 | Wang | G02B 27/0172 |
| | | | 359/630 |
| 10,338,388 B2* | 7/2019 | Hirano | G02B 27/0176 |
| 2002/0057881 A1 | 5/2002 | Greer | |
| 2002/0081392 A1 | 6/2002 | Kamen et al. | |
| 2003/0139487 A1 | 7/2003 | Montgomery et al. | |
| 2006/0181208 A1 | 8/2006 | Jeon | |
| 2006/0287408 A1* | 12/2006 | Baikerikar | C09D 7/61 |
| | | | 522/71 |
| 2007/0151178 A1 | 7/2007 | Baikerikar et al. | |
| 2007/0188837 A1 | 8/2007 | Shimizu et al. | |
| 2008/0132597 A1 | 6/2008 | Nozawa et al. | |
| 2010/0092693 A1 | 4/2010 | Park et al. | |
| 2015/0065598 A1 | 3/2015 | Paek et al. | |
| 2015/0138646 A1* | 5/2015 | Tatsugi | B29D 11/00663 |
| | | | 359/633 |
| 2016/0154243 A1* | 6/2016 | Aiki | G02B 27/0176 |
| | | | 359/633 |
| 2017/0198157 A1 | 7/2017 | Park et al. | |
| 2018/0067251 A1* | 3/2018 | Baldwin | G02B 5/1866 |
| 2019/0002718 A1 | 1/2019 | Choi et al. | |

FOREIGN PATENT DOCUMENTS

| | | |
|---|---|---|
| CN | 104817878 A | 8/2015 |
| JP | 2007055993 A | 3/2007 |
| JP | 2007219106 A | 8/2007 |
| JP | 2017203162 A | 11/2017 |
| KR | 19980701347 A | 5/1998 |
| KR | 20050034624 A | 4/2005 |
| KR | 20060091669 A | 8/2006 |
| KR | 20070115305 A | 12/2007 |
| KR | 100820175 B1 | 4/2008 |
| KR | 20090027076 A | 3/2009 |
| KR | 20120076973 A | 7/2012 |
| KR | 20150026302 A | 3/2015 |
| KR | 20150078378 A | 7/2015 |
| KR | 20150142512 A | 12/2015 |
| KR | 20160071336 A | 6/2016 |
| KR | 20170075931 A | 7/2017 |
| TW | 589353 B | 6/2004 |
| TW | 201102412 A | 1/2011 |
| TW | 201214046 A | 4/2012 |
| WO | 1998052700 A1 | 11/1998 |
| WO | 2007002328 A1 | 1/2007 |
| WO | 2012044027 A2 | 4/2012 |

OTHER PUBLICATIONS

Extended European Search Report including Written Opinion for EP18882711.7 dated Jul. 10, 2020; 9 pages.
Search Report from Taiwanese Office Action for TW107141464 dated May 21, 2020: 1 page.

* cited by examiner

[FIG. 1] (PRIOR ART)
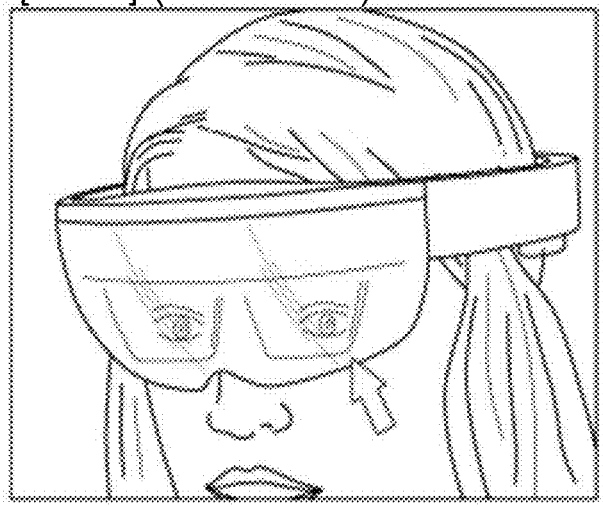
[FIG. 2]
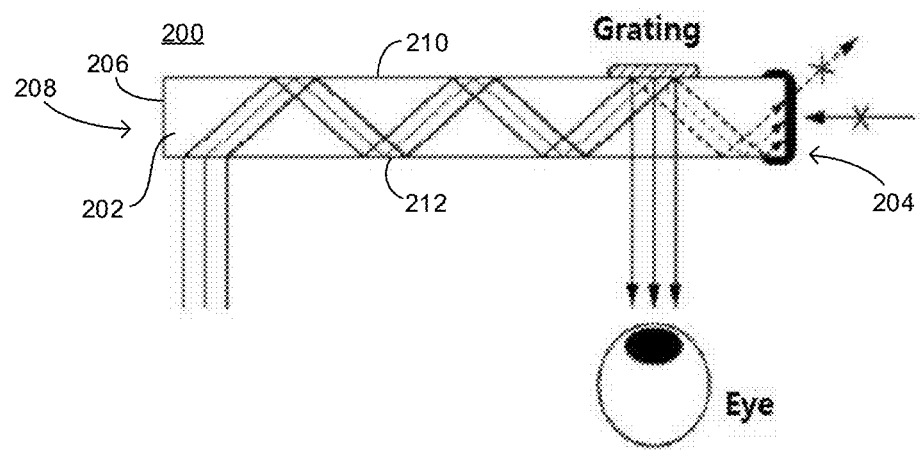
[FIG. 3]
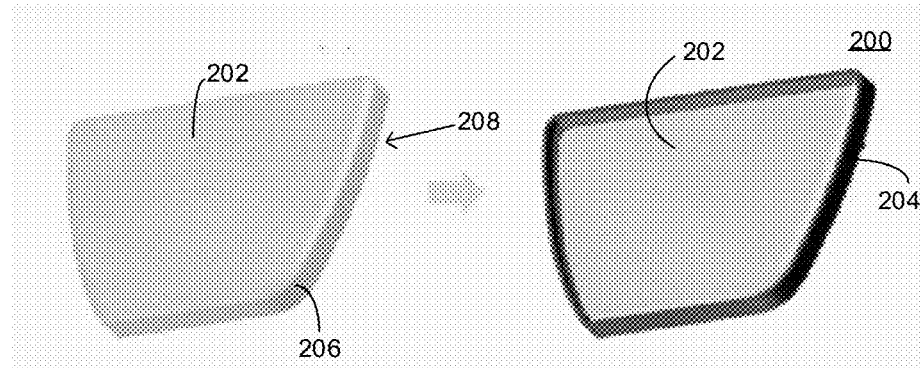

FIG. 4a  FIG. 4b  FIG. 4c
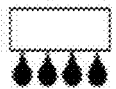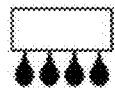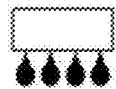
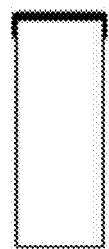
[FIG. 5]
FIG. 6
[FIG. 6]
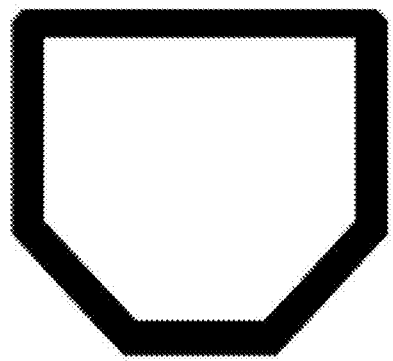

OB

5B

WAVEGUIDE EDGE LIGHT SHIELDING COMPOSITION HAVING EXCELLENT ADHESIVE STRENGTH

CROSS-REFERENCE TO RELATED APPLICATIONS

The present application is a national phase entry under 35 U.S.C. § 371 of International Application No. PCT/KR2018/014192, filed on Nov. 19, 2018, which claims the benefit of priority from Korean Patent Application No. 10-2017-0160204, filed on Nov. 28, 2017, the disclosures of which are incorporated herein by reference.

FIELD OF THE INVENTION

The present invention relates to a composition for light-shielding a waveguide edge with excellent adhesion, and more particularly to a composition for use in the light-shielding layer on a waveguide to suppress light leakage and external light inflow. The present invention also relates to a waveguide including the light-shielding layer formed from the composition, a waveguide module comprising the waveguide, and a preparation method of the waveguide.

BACKGROUND OF THE INVENTION

A wearable augmented reality device represented by augmented reality (AR) glasses requires a near-eye display (NED) to transmit a digital image to the user's eyes. One of the components of the NED is a planar waveguide. The light incident on the waveguide is transmitted in a direction parallel to the waveguide plane and is reflected by a grating or a half mirror to reach the user's eye. At this time, some light propagate to the end of the waveguide and emit from the edge of the waveguide, causing the light leakage phenomenon as shown in FIG. 1 during operating the NED. Such light leakage phenomenon should be improved because it impairs user convenience and aesthetics when the product is operated. Also, external light entering the waveguide at the edge of the waveguide may cause unintended optical interference, which may result in degradation of image quality.

Therefore, by forming a light-shielding coating on the cut portion of the waveguide edge, it is possible to suppress the inflow of external light to suppress the degradation of image quality output from the NED. In the past, a plastic case was put on a waveguide or a tape was attached to a rim.

However, in the above methods, the thickness of the light-shielding layer is as thick as, for example, several hundreds of microns to several tens of millimeters, and it has been difficult to control the width of the light-shielding coating thinly and precisely to the level of several hundreds of nanometers to several hundreds of microns.

PRIOR ART DOCUMENT

Patent Literature (Patent Document 1) KR 10-2012-0076973 A

SUMMARY OF THE INVENTION

It is difficult to coat a narrow cut surface of a waveguide with an ink for forming a light-shielding film by a conventional means such as contact printing, for example screen printing. In particular, when the cut surface of the waveguide is a curved surface or an inclined surface, it was difficult to precisely coat the cut surface with the light-shielding layer. However, the inkjet printing method as a non-contact printing method enables a precise printing even in a narrow cut portion having a curved surface or an inclined surface.

It is an object of the present invention to provide a ultraviolet (UV) curable composition for light-shielding a rim side of a waveguide to prevent light leakage occurring and inflow of external light into the waveguide, by coating and curing a composition containing a colorant on a cut surface of the rim side of the waveguide to form a light-shielding film, and a waveguide including the light-shielding layer formed from the composition.

In order to solve the above problems, the present invention provides a UV curable composition for light-shielding a rim side of a waveguide, comprising a colorant, an acrylate monomer, a urethane acrylate oligomer, an organosilane, and a photopolymerization initiator, wherein adhesion between the cured composition and a glass substrate is 5B or more in accordance with ASTM D3359 standard and/or 1500 mN or more in accordance with a microscratch test (MST).

Further, the present invention provides a method of manufacturing a planar waveguide, comprising: a) coating the composition on a rim side of the waveguide; and b) curing the composition to form the light-shielding film having an optical density (OD) of 1.5 or more.

Further, the present invention provides a planar waveguide including a waveguide and a light-shielding film on a cut surface of a rim side of the waveguide, and a waveguide module comprising the waveguide, wherein the thickness of the light-shielding film is 2 to 120 µm, adhesion between the light-shielding film and the waveguide is 5B or more in accordance with ASTM D3359 standard and/or 1500 mN or more in accordance with a microscratch test (MST).

Effect of the Invention

According to the present invention, the light leakage phenomenon occurring at the rim side of the waveguide and the inflow of external light into the waveguide can be prevented by coating and curing the composition according to the present invention on a cut surface of the rim side of the waveguide to form a light-shielding film having excellent optical density and excellent hardness even in a thin thickness.

BRIEF DESCRIPTION OF THE DRAWINGS

FIG. 1 is a schematic drawing showing the use of a waveguide and light leakage phenomenon in accordance with the prior art.

FIG. 2 is a schematic view showing a light traveling path according to the waveguide of the present invention.

FIG. 3 is a schematic view illustrating a process of forming a light-shielding film of the waveguide of the present invention.

FIGS. 4A-C are a schematic view showing a method for forming a light-shielding film according to the shape of the cut surface of the waveguide of the present invention.

FIG. 5 is a schematic cross-section view of the waveguide manufactured according to the Examples of the present invention.

FIG. 6 is a schematic front view of the waveguide manufactured according to the Examples of the present invention.

DETAILED DESCRIPTION OF THE INVENTION

Figure 7A:
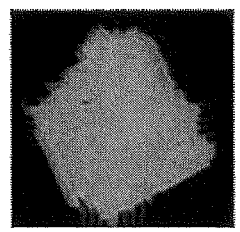
FIGS. 7A-B are views showing the degree of crosscut according to the composition of Example (FIG. 7B) and Comparative Example (FIG. 7A) according to the present invention.

Hereinafter, the present invention will be described in more detail. The present invention provides an ultraviolet (UV) curable composition for light-shielding a rim side of a waveguide, comprising a colorant, an acrylate monomer, a urethane acrylate oligomer, an organosilane, and a photopolymerization initiator, wherein adhesion between the cured composition and a glass substrate is 5B or more in accordance with ASTM D3359 standard and/or 1500 mN or more in accordance with a microscratch test (MST).

The UV curable composition of the present invention may further comprise at least one selected from the group consisting of a photosensitizer, an adhesion promoter, and a surfactant.

The advantages of the UV curable composition can be maximized by the combination of the respective components. Hereinafter, each component of the UV curable composition will be described in detail.

The UV curable composition may contain an acrylate monomer and a urethane acrylate oligomer as a polymerizable unsaturated compound. The UV curable composition may be used in combination with a urethane acrylate oligomer so as to attain appropriate toughness and the appropriate adhesion to the substrate after curing, without impairing the dispersibility of the pigment.

The acrylate monomer chemically reacts with the urethane acrylate oligomer during curing to achieve an appropriate degree of curing.

The acrylate monomer may comprise at least one selected from the group consisting of a monofunctional acrylate monomer having one acrylate functional group, a bifunctional acrylate monomer having two acrylate functional groups, and a polyfunctional acrylate monomer having three or more acrylate functional groups.

The monofunctional acrylate monomer may comprise an alkyl acrylate having a linear or branched alkyl group having 1 to 14 carbon atoms. The composition can ensure an appropriate viscosity through the alkyl group having the above range of carbon atoms and can achieve an appropriate degree of curing and hardness after curing.

For example, the alkyl acrylate may be selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl (meth)acrylate and combinations thereof.

In addition, the monofunctional acrylate monomer may further contain a carboxyl group-containing (meth)acrylate monomer or a hydroxy group-containing (meth)acrylate monomer. The appropriate adhesive force can be imparted through a carboxyl group or a hydroxyl group. For example, the (meth)acrylate monomer containing a carboxyl group or a hydroxyl group may comprise any one selected from the group consisting of acrylic acid, methacrylic acid, 2-(meth)acryloyloxyacetic acid, 3-(meth)acryloyloxypropanoic acid, 4-(meth)acryloyloxybutanoic acid, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and a combination thereof. In one embodiment, the monofunctional (meth)acrylate monomer may have a glass transition temperature (Tg) of about −60° C. to about 100° C. The composition according to the present invention can achieve low cure shrinkage via the monofunctional acrylate monomer having a glass transition temperature (Tg) in the above range.

Examples of the monomer containing two or more acrylate functional groups include bifunctional monomers such as propylene glycol diacrylate, trifunctional monomers such as pentaerythritol triacrylate, and hexafunctional monomers such as dipentaerythritol hexaacrylate, but are not limited thereto. When a cured product having a relatively low modulus of elasticity is required, it is preferable to use a monofunctional compound. However, the modulus of elasticity of the cured product may be controlled by combining with a compound containing two or more acrylate functional groups in an appropriate ratio.

In one embodiment, the acrylate monomer may comprise at least one selected from the group consisting of tetrahydrofurfuryl acrylate, cyclic trimethylolpropane formal acrylate, bisphenol A epoxy diacrylate, 2-hydroxyethyl acrylate, hydroxypivalic neopentyl glycol diacrylate, hydroxyethyl methacrylate, trimethylolpropane triacrylate, tris(2-hydroxyethyl)isocyanurate triacrylate, pentaerythritol tetraacrylate, 2-hydroxyethyl acrylate and dipentaerythritol hexaacrylate, hexanediol diacrylate, tripropylene glycol diacrylate, dipentaerythritol hexaacrylate, dipentaerythritol pentaacrylate, and the like.

In one embodiment, it is preferred that the content of the monofunctional acrylate monomer is from 5 to 40% by weight based on the total weight of the ink composition. If the content is 5% by weight or less, the solubility of the initiator is lowered and the cure shrinkage of the coating layer is increased. If the content is 40% by weight or more, the hardness of the cured product is lowered and sticking phenomenon occurs.

In one embodiment, the content of the bifunctional or higher acrylate monomer is preferably from 10 to 70% by weight, for example from 15 to 50% by weight, based on the total weight of the ink composition. If the content is 10% by weight or less, the hardness of the coating layer is lowered. If the content is 70% by weight or more, the shrinkage of the coating layer is increased and its adhesive force to the substrate is lowered.

The urethane acrylate oligomer is a compound prepared by polymerizing a polyether polyol, a hydroxyl group-containing acrylic derivative and a diisocyanate compound, and has carbon-carbon double bonds at both terminals. The polyether polyol preferably has a number average molecular weight of 300 to 30,000, more preferably 500 to 10,000. As the diisocyanate compound, any aliphatic or aromatic diisocyanate may be used, which is used in ordinary urethane synthesis.

The urethane acrylate oligomer preferably has a number average molecular weight of 500 to 40,000, more preferably 500 to 30,000. If the number average molecular weight is less than 500, it is difficult to achieve the improved properties desired. If the number average molecular weight is more than 40,000, the overall photocuring property and the alkaline developability are adversely affected.

The urethane acrylate oligomer is preferably used in an amount of 0.5 to 30% by weight (which means weight percent of solids excluding solvent) based on the total weight of the composition. If it is used in an amount less than 0.5% by weight, it is difficult to obtain the improved properties desired. If it is used in an amount exceeding 30% by weight, there is a problem in photocurability.

In addition, the composition of the present invention may contain the acrylate monomer and the urethane acrylate oligomer in a weight ratio of 2:1 to 8:1. In another embodiment, the weight ratio of the acrylate monomer to the urethane acrylate oligomer may be from 2:1 to 6:1, or from 3:1 to 5:1.

The composition of the present invention may further contain a radical photopolymerization initiator for performing a curing reaction by light irradiation. The radical photopolymerization initiator may comprise any one selected from the group consisting of a hydroxyketone-based compound, a phenylglyoxylate-based compound, a benzyldimethylketal-based compound, an α-aminoketone-based compound, a monoacylphosphine-based compound, a bisacylphosphine-based compound, a phosphine oxide-based compound, a metallocene-based compound, an iodonium salt, and combinations thereof, but is not limited thereto.

The radical photopolymerization initiator is preferably contained in an amount of 0.5 to 10% by weight based on the total weight of the UV curable composition. If the content is less than 0.5% by weight, the curing reaction is not sufficiently accomplished. If the content is more than 10% by weight, the radical photopolymerization initiator is may not be completely dissolved in the curable composition or the viscosity of the composition may be increased, and as a result, the coatability of the composition may be deteriorated.

The curable ink composition may not contain a solvent.

The curable ink composition contains a colorant. The colorant may be used in the form of a pigment dispersion containing one or more pigments, dyes, or a mixture thereof, and is not particularly limited as long as it can express colors as required.

In one embodiment of the invention, carbon black, graphite, metal oxide, organic black colorant and the like can be used as the colorant.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500, RAVEN-2000, RAVEN-1500, RAVEN-1255, RAVEN-1250, RAVEN-1200, RAVEN-1190ULTRA, RAVEN-1170 (Columbia Carbon Co.), mixtures thereof, or the like.

As the organic black colorant, aniline black, lactam black, or perylene black series may be used, but the organic black colorant is not limited thereto.

In the present invention, the curable ink composition is cured by irradiation with UV radiation (e.g., 250 or 450 nm), more preferably with UV radiation having a long wavelength (e.g., 360 to 410 nm) to achieve a certain level of OD. For this purpose, the content of the colorant may be preferably 0.1 to 15% by weight, more preferably 0.5 to 5% by weight based on the total weight of the curable ink composition. If the content is less than 0.1% by weight, a level of OD applicable to the light-shielding film may not be obtained. If it exceeds 15% by weight, an excessive amount of colorant may not be dispersed in the ink and may be precipitated, or UV light may not penetrate into the film after coating and the film may not be sufficiently cured up to the core portion.

The curable ink composition may further comprise an adhesion promoter as an additive. The light-shielding film on the cut surface of the waveguide repeatedly shrinks and expands depending on the conditions of use such as temperature and humidity, so that the light-shielding film may be stressed, and as a result the light-shielding film is detached from the waveguide. In order to prevent this, at least one silane-based compound selected from the group consisting of an epoxysilane-based compound, an aminosilane-based compound, a methacryloxysilane-based compound, a vinylsilane-base compound, a mercaptosilane-based compound, an acryloxysilane-based compound, an isocyanatesilane-based compound may be used as the adhesion promoter to exhibit excellent results.

Among them, the aminosilane-based compound is preferable as the adhesion promoter of the present invention. For example, 3-aminopropyltriethoxysilane, 3-triethoxysilyl-N-(1,3-dimethyl-butylidene)propylamine, N-2-(aminoethyl)-3-aminopropyltrimethoxysilane, N-2-(aminoethyl)-3-aminopropylmethyldimethoxysilane, 3-aminopropyltrimethoxysilane, and the like.

In another embodiment of the present invention, an epoxysilane-based compound may be used as the adhesion promoter, and examples thereof include 3-aminopropyltrimethoxysilane, 3-glycidoxypropyltrimethoxysilane, methacryloyloxypropyltrimethoxysilane, methacryloyloxypropyldimethoxysilane, methacryloyloxypropyltriethoxysilane, methacryloyloxypropyldimethoxysilane, octyltrimethoxysilane, dodecyltrimethoxysilane, octadecyltrimethoxysilane and the like can be used.

The adhesion promoter is preferably contained in an amount of 0.1 to 15% by weight, more preferably 2 to 10% by weight based on the total weight of the ink composition. If the amount is less than 0.1% by weight, the light-shielding film cannot be prevented from being detached from the waveguide. If the amount is more than 15% by weight, the viscosity of the ink solution increases and the dispersibility is low.

The UV curable ink composition may further contain a surfactant that lowers the surface tension of the composition.

As the surfactant, commercially available products can be used, for example it may be selected from the group consisting of Megafack F-444, F-475, F-478, F-479, F-484, F-550, F-552, F-553, F-555, F-570 and RS-75 from DIC (DaiNippon Ink & Chemicals), or Surflon S-111, S-112, S-113, S-121, S-131, S-132, S-141 and S-145 (Asahi Glass Co., Ltd.), or Fluorad FC-93, FC-95, FC-98, FC-129, FC-135, FC-170C, FC-430 and FC-4430 (Sumitomo 3M Co., Ltd.), or Zonyl FS-300, FSN, FSN-100 and FSO (DuPont), or BYK-306, BYK-310, BYK-320, BYK-331, BYK-333, BYK-342, BYK-350, BYK-354, BYK-355, BYK-356, BYK-358N, BYK-359, BYK-361 N, BYK-381, BYK-370, BYK-371, BYK-378, BYK-388, BYK-392, BYK-394, BYK-399, BYK-3440, BYK-3441, BYKETOL-AQ, BYK-DYNWET 800, BYK-SILCLEAN 3700 and BYK-UV 3570 (BYK), or Rad 2100, Rad 2011, Glide 100, Glide 410, Glide 450, Flow 370 and Flow 425 (TEGO), etc.

The surfactant is preferably contained in an amount of 0.1 to 5.0% by weight based on the total weight of the curable ink composition, and 0.5 to 3.0% by weight in another embodiment. When the content of the surfactant is less than 0.1% by weight, the effect of lowering the surface tension of the composition may be insufficient, resulting in coating failure when the composition is coated on the substrate. If the content is more than 5.0% by weight, the surfactant may be used in an excessive amount, resulting in a problem that the compatibility and the antifoaming property of the composition would rather be reduced.

The curable ink composition may further comprise a photosensitizer to compensate the curing properties on active energy ray with long wavelength.

The photosensitizer may be at least one selected from the group consisting of anthracene-based compounds such as anthracene, 9,10-dibutoxy anthracene, 9,10-dimethoxy anthracene, 9,10-diethoxy anthracene and 2-ethyl-9,10-dimethoxy anthracene; benzophenone-based compounds such as benzophenone, 4,4-bis(dimethylamino)benzophenone, 4,4-bis(diethylamino)benzophenone, 2,4,6-trimethylamino-benzophenone, methyl-o-benzoylbenzoate, 3,3-dimethyl-4-methoxybenzophenone and 3,3,4,4-tetra(t-butylperoxycarbonyl)benzophenone; acetophenone; ketone-based compounds such as dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thioxanthone-based compounds such as thioxanthone, 2,4-diethyl thioxanthone, 2-chloro thioxanthone, 1-chloro-4-propyloxy thioxanthone, isopropyl thioxanthone (ITX), diisopropyl thioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis(9-acridinyl) propane; dicarbonyl compounds such as benzyl, 1,7,7-trimethyl-bicyclo[2,2,1]heptane-2,3-dione and 9,10-phenanthrenequinone; phosphine oxide-based compounds such as 2,4,6-trimethylbenzoyldiphenylphosphine oxide and bis(2,6-dimethoxybenzoyl)-2,4,4-trimethylpentylphosphine oxide; benzoate-based compounds such as methyl-4-(dimethylamino)benzoate, ethyl-4-(dimethylamino)benzoate and 2-n-butoxyethyl-4-(dimethylamino)benzoate; amino synergists such as 2,5-bis(4-diethylaminobenzal)cyclopentanone, 2,6-bis(4-diethylaminobenzal)cyclohexanone, and 2,6-bis (4-diethyaminobenzal)-4-methyl-cyclopentanone; coumarin-based compounds such as 3,3-carbonylvinyl-7-(diethylamino)coumarin, 3-(2-benzothiazolyl)-7-(diethylamino) coumarin, 3-benzoyl-7-(diethylamino)coumarin, 3-benzoyl-7-methoxy-coumarin and 10,10-carbonylbis[1,1,7,7-tetramethyl-2,3,6,7-tetrahydro-1H,5H,11H-C1] benzopyrano[6,7,8-ij]-quinolizin-11-one; chalcone compounds such as 4-diethylaminochalcone and 4-azido-benzalacetophenone; 2-benzoylmethylene; and 3-methyl-b-naphthothiazoline.

The photosensitizer is preferably contained in an amount of 1 to 200 parts by weight, more preferably 10 to 100 parts by weight, based on 100 parts by weight of the photopolymerization initiator. If the amount is less than 1 part by weight, a synergistic effect of curing sensitivity at a desired wavelength may not be obtained. If the amount is more than 200 parts by weight, the photosensitizer may not be dissolved in the ink and the adhesive force and crosslinking density of the pattern may be lowered.

The curable ink composition used in the present invention exhibits excellent coating properties, and exhibits excellent adhesion properties by curing. The curable ink composition has a curing dose of 1 to 10,000 mJ/cm$^2$, preferably 80 to 3,000 mJ/cm$^2$. The curable ink composition is cured by absorbing UV light in a wavelength range of 250 nm to 450 nm, preferably 360 nm to 410 nm.

The UV curable composition, for example, having a viscosity of 10 to 10,000 mPa·s or 100 to 10,000 mPa·s at 25° C., is suitable for dispenser process. The UV curable composition having such a viscosity range is well discharged at a process temperature. The process temperature refers to a heated temperature in order to lower viscosity of the UV curable composition. The process temperature may be from 10° C. to 100° C., and preferably from 20° C. to 70° C.

In addition, when the curable ink composition is evaporated, for example, in a convection oven at 35° C., the residual mass after the elapse of 2 hours may be 85% or more, so that the curing rate and the film characteristics may not be degraded while the evaporation rate is low.

The UV curable composition of the present invention has the hardness and the adhesion to a glass substrate after curing of 5B or more in accordance with ASTM D3359 standard and/or 1500 mN or more in accordance with a microscratch test (MST).

The present invention provides a planar waveguide including a light-shielding film on a cut surface of a rim side of the waveguide. When light is entered and reflected by the inner wall of the planar waveguide, if the appropriate shielding film is not formed on the cut surface of the rim side, there arises a problem that internal light emits (light leakage phenomenon) or unnecessary light is introduced from the outside.

As shown in FIG. 2, the planar waveguide (200) of the present invention includes a waveguide (202) and a light-shielding film (204) disposed on a cut surface (206) of a rim side (208) of the waveguide (202). The light-shielding film (204) has a thin thickness and excellent optical density (OD) on the cut surface of its rim side. Due to this, it is possible to block the emission of internal and light the inflow of external light.

The waveguide (202) includes a first surface (210) and an opposing second surface (212) separated by a thickness therebetween. The first and second surfaces (210, 212) extend to the rim side (208).

The cut surface (206) of the rim side (208) of the waveguide (202) having the light-shielding film (204) may be a planar surface, a curved surface, or an inclined surface. The light-shielding film (204) of the present invention can be formed in various shapes by a manufacturing method described later.

Further, the light-shielding film (204) may be formed on first and second surfaces (210, 212) at the periphery thereof (as illustrated in FIG. 2) and on the cut surface (206) of the rim side (208) of the waveguide (202). By forming the light-shielding film (204) not only on the periphery of the first and second surfaces (210, 212) but also on the rim side (including the edge), it is possible to block the emission of internal light and the inflow of external light in the waveguide.

The light-shielding film comprises at least one black ink colorant selected from the group consisting of carbon black, graphite, metal oxide, organic black colorants.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100 and LAMP BLACK-101 (Degussa Co., Ltd.); RAVEN-1100ULTRA, RAVEN-1080UL-TRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 (Columbia Carbon Co.), mixtures thereof, or the like.

As the organic black colorants, aniline black, lactam black, or perylene black series may be used, but the organic black colorants are not limited thereto.

The content of the black ink colorants may be 0.1 to 15% by weight based on the total weight of the light-shielding film. If the content of the black ink colorants satisfies the above range, it is possible to manufacture a light-shielding film having a high optical density per its thickness while securing dispersion stability and storage stability of ink without impairing the UV curing of the film.

As shown in FIG. 3, the waveguide (200) of the present invention having the light-shielding film (2004 on the cut surface (206) of the rim side (208) can suppress the light leakage and block the inflow of external light.

In addition, the waveguide of the present invention may have a total optical density (OD) of 1.5 or more in order to suppress the light leakage and block the inflow of external light. In one example according to the present invention, the total optical density of the light-shielding film does not exceed 6. In one embodiment of the present invention, the light-shielding film is excellent in adhesion and coating property with an adhesion to a waveguide of 5B or more in accordance with ASTM D3359 standard and/or 1500 mN or more in accordance with a microscratch test (MST).

The present invention also provides a waveguide module comprising the waveguide. The waveguide module is not particularly limited as long as the waveguide of the present invention is used, but it can be used for augmented reality (AR) glasses and the like.

The present invention provides a method of manufacturing a planar waveguide, comprising: a) coating the UV curable composition on a rim side of the waveguide; and b) curing the composition to form the light-shielding film having an optical density (OD) of 1.5 or more.

For forming the light-shielding film on the cut surface of the rim side of the planar waveguide in the step a), a dispenser process or an inkjet printing method may be used. The inkjet printing method can be used in a usual manner. The dispenser process may use a pneumatic or piezo-electric dispensing valve as a fine dispensing device, preferably a dispenser printing method.

When the ink composition is coated by the above-described printing method, as shown in FIGS. 4A-C, it may be effectively coated and cured to form a light-shielding film on the cut surface of the rim side of the waveguide having an inclined surface (FIG. 4B), a curved surface (FIG. 4C), or a planar surface (FIG. 4A).

The curing in the step b) may be UV curing. A light source in a wavelength of 250 to 450 nm, more preferably, 360 to 410 nm may be used in the UV curing.

The adhesion to the waveguide of the light-shielding film produced by the above method may be 5B or more in accordance with ASTM D3359 standard and/or 1500 mN or more in accordance with a microscratch test (MST).

Hereinafter, the present invention will be described in detail with reference to examples.

EXAMPLES

Preparation Example 1

TABLE 1

| Composition | | Exam 1 | Exam 2 | Exam 3 | Exam 4 | Exam 5 | Comp Exam 1 |
|---|---|---|---|---|---|---|---|
| Pigment | Carbon black | 1.2 | 1.2 | 1.2 | 1.2 | 1.2 | 1.2 |
| Monofunctional acryl monomer | Tetrahydrofurfuryl acrylate | 17 | 17 | 17 | 17 | 17 | 17 |
| | Cyclic trimethylolpropane formal acrylate | 2 | 2 | 2 | 2 | 2 | 3 |
| Bifunctional acryl monomer | Bisphenol A epoxy diacrylate | 6 | 6 | 6 | 6 | 6 | 6 |
| | Hydroxypivalic neopentyl glycol diacrylate | 15 | 15 | 15 | 15 | 15 | 16 |
| Multifunctional acryl monomer | Trimethylolpropane triacrylate | 5 | 5 | 5 | 5 | 5 | 6 |
| | Tris(2-hydroxyethyl)isocyanurate triacrylate | 9 | 9 | 9 | 9 | 9 | 9 |

TABLE 1-continued

| Composition | | Exam 1 | Exam 2 | Exam 3 | Exam 4 | Exam 5 | Comp Exam 1 |
|---|---|---|---|---|---|---|---|
| | Pentaerythritol tetraacrylate | 7 | 7 | 7 | 7 | 7 | 7 |
| Urethane acrylate oligomer | CN8887 | 15 | 0 | 0 | 0 | 7.5 | 0 |
| | PU256 | 0 | 15 | 0 | 0 | 7.5 | 0 |
| | CN9021 | 0 | 0 | 15 | 0 | 0 | 0 |
| | CN8888 | 0 | 0 | 0 | 15 | 0 | 0 |
| | Phosphate methacrylate | 10 | 10 | 10 | 10 | 10 | 20 |
| Organosilane | 3-Aminopropyl trimethoxy silane | 3 | 3 | 3 | 3 | 3 | 5 |
| photopolymerization initiator | Bis(2,4,6-trimethylbenzoyl)-phenylphosphine oxide | 2 | 2 | 2 | 2 | 2 | 2 |
| | 2-Benzyl-2-dimethyl-amino-1-(4-morpholino-phenyl)-butanone-1 | 4 | 4 | 4 | 4 | 4 | 4 |
| | Diphenyl(2,4,6-trimethyl-benzoyl)phosphine oxide | 1 | 1 | 1 | 1 | 1 | 1 |
| photosensitizer | | 2 | 2 | 2 | 2 | 2 | 2 |
| Surfactant | | 0.8 | 0.8 | 0.8 | 0.8 | 0.8 | 0.8 |

CN8887: Sartomer USA, LLC (Sartomer)
PU256: Miwon Specialty Chemical Co., Ltd
CN9021: Sartomer USA, LLC (Sartomer)
CN8888: Sartomer USA, LLC (Sartomer)

TABLE 2

| Composition | | Example 6 | Comparative Example 2 |
|---|---|---|---|
| Pigment | Carbon black | 1.2 | 1.2 |
| Monofunctional acryl monomer | 2-Hydroxyethyl acrylate | 25 | 32 |
| Multifunctional acryl monomer | Trimethylolpropane triacrylate | 30 | 37 |
| | Dipentaerythritol hexaacrylate | 10 | 10 |
| Urethane acrylate oligomer | Epoxy acrylic resin (PD-7610) | 5 | 6 |
| | CN8887 | 15 | 0 |
| | PU256 | 0 | 0 |
| | CN9021 | 0 | 0 |
| | CN8888 | 0 | 0 |
| | Phosphate methacrylate | 5 | 5 |
| Organosilane | 3-Glycidoxypropyl trimethoxysilane | 2.5 | 2.5 |
| Photopolymerization initiator | 2-Methyl-1-[4-(methylthio)phenyl]-2-(4-morpholinyl)-1-propanone | 5 | 5 |
| Photosensitizer | | 1 | 1 |
| Surfactant | | 0.3 | 0.3 |

The compositions for forming a light shielding film which are prepared by mixing the constituents of Examples 1 to 6 and Comparative Examples 1 and 2 were coated by a spin coating method on the upper surface of the cleaned waveguide (illustrated in FIGS. 5-6) so as to have the OD of the light-shielding film of about 1.5 after curing. In order to prevent foreign matters from adhering, the coating layers were irradiated with UV light (395 nm) under the following conditions and cured within 1 minute after coating to form the light-shielding films. The UV light was irradiated at a light intensity of 2500 mJ/cm$^2$ by using an LED lamp having a wavelength of 395 nm.

Experimental Example 1

Evaluation of OD of the light-shielding film The OD values of the respective light-shielding films were measured by using an X-rite OD measuring device and are shown below.

Experimental Example 2: Cross-Cut Test

A cross-cut test was performed in accordance with ASTM D3359 standard, which is a cross-cut test standard, on the light-shielding film having the same thickness on the waveguide plane. Specifically, 11 lines were drawn on the specimens with a cutter knife at intervals of 1 mm in the transverse and longitudinal directions, respectively, to form 100 square lattices of 1 mm in width and 1 mm in length. Then, CT-24 adhesive tape (Nichiban Co., Ltd.) was attached to the cut surface. When the adhesive tape was peeled off, the state of the surface that detached with the adhesive tape was evaluated according to the following criteria. The results are shown in Table 3 below.

<Evaluation Criteria of Cross-Hatch Adhesion Force>
5B: None of area is detached.
4B: less than 5% with respect to the total area is detached.
3B: 5% to 15% with respect to the total area is detached.
2B: 15% to 35% with respect to the total area is detached.
1B: 35% to 65% with respect to the total area is detached.
0B: Most of area is detached.

TABLE 3

| | Exam 1 | Exam 2 | Exam 3 | Exam 4 | Exam 5 | Exam 6 | Comp. Exam 1 | Comp. Exam 2 |
|---|---|---|---|---|---|---|---|---|
| Adhesion (cross-cut) | 5B | 5B | 5B | 5B | 5B | 5B | 0B | 0B |
| OD | 1.50 | 1.52 | 1.51 | 1.53 | 1.50 | 1.55 | 1.52 | 1.50 |

Figure 7B:
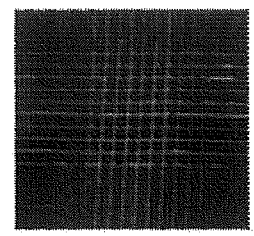

From the results shown in Table 3 and FIGS. 7A-B, the respective light-shielding films prepared in Examples 1 to 6 exhibited a 5B-level of adhesion even without any heat treatment, whereas the light-shielding films prepared in Comparative Example 1 and Comparative Example 2 having no urethane acrylate oligomer exhibited a OB-level of adhesion. It was confirmed that the light-shielding films prepared in Examples 1 to 6 achieve better adhesion than that of the existing materials.

Preparation Example 2

TABLE 4

| Composition | | Example 7 | Example 8 |
|---|---|---|---|
| Colorant | Carbon black pigment | 1.2 | 2 |
| Monofunctional acryl monomer | Tetrahydrofurfuryl acrylate | 15 | 15 |
| | Cyclic trimethylolpropane formal acrylate | 2 | 2 |
| Bifunctional acryl monomer | Bisphenol A epoxy diacrylate | 5 | 5 |
| | Hydroxypivalic neopentyl glycol diacrylate | 19.8 | 15 |
| Multifunctional acryl monomer | Trimethylolpropane triacrylate | 5 | 7 |
| | Tris(2-hydroxy-ethyl)isocyanurate triacrylate | 8 | 10 |
| | Pentaerythritol tetraacrylate | 6.4 | 6.4 |
| Urethane acrylate oligomer | Bifunctional urethane acrylate oligomer | 15 | 15 |
| | Phosphate methacrylate | 10 | 10 |
| Organosilane | 3-Aminopropyl trimethoxysilane | 3 | 3 |
| Photopolymerization initiator | Bis(2,4,6-trimethylbenzoyl)-phenylphosphine oxide | 2 | 2 |
| | 2-Benzyl-2-dimethylamino-1-(4-morpholinophenyl)-butanone-1 | 4 | 4 |
| | Diphenyl(2,4,6-trimethyl benzoyl)phosphine oxide | 1 | 1 |
| Photosensitizer | | 1.6 | 1.6 |
| Surfactant | | 1 | 1 |

TABLE 5

| Composition | | Comp. Example 3 | Comp. Example 4 | Comp. Example 5 |
|---|---|---|---|---|
| Colorant | Carbon black Pigment | 12 | 6 | 1 |
| Aliphatic epoxy | 3,4-Epoxycyclohexylmethyl-3',4'-epoxycyclohexane | 12.5 | 38.5 | 62.5 |
| | Bi-7-oxabicyclo[4.1.0]heptane | 0 | 25 | 0 |
| Vinyl ether | 1,4-Cyclohexanedimethanoldivinyl ether | 10.6 | 5 | 11 |
| Oxetane | 3-Ethyl-3-[(2-ethylhexyloxy)methyl]oxetane | 29.5 | 10 | 15 |
| Acrylic resin | Epoxy acrylic resin | 0 | 5 | 0 |
| Solvent | Diethylene glycol dibutylether | 26.9 | 0 | 0 |
| Photo-initiator | 4-Isobutylphenyl-4'-methylphenyliodium hexafluorophosphate | 4 | 5 | 5 |
| Organo-silane | 3-Glycidoxypropyltrimethoxy silane | 2 | 2.5 | 2.5 |
| Photosensitizer | | 1.5 | 2 | 2 |
| Surfactant | | 1 | 1 | 1 |

The compositions for forming a light shielding film which are prepared by mixing the constituents of Examples 7 and 8 and Comparative Examples 3 to 5 were coated by a spin coating method on the upper surface of the cleaned waveguide so as to have a thickness of 10 μm of the light-shielding film after curing. In order to prevent foreign matters from adhering, the coating layers were irradiated with UV light (395 nm) under the following conditions and cured within 1 minute after coating to form the light-shielding films. The UV light was irradiated at a light intensity of 2500 mJ/cm$^2$ using an LED lamp having a wavelength of 395 nm.

Experimental Example 3: Cross-Cut Test

A cross-cut test was performed in accordance with ASTM D3359 standard, which is a cross-cut test standard, on the light-shielding films manufactured having the same thickness on the waveguide plane. Specifically, 11 lines were drawn on the specimens with a cutter knife at intervals of 1 mm in the transverse and longitudinal directions, respectively, to form 100 square lattices of 1 mm in width and 1 mm in length. Then, CT-24 adhesive tape (Nichiban Co., Ltd.) was attached to the cut surface. When the adhesive tape was peeled off, the state of the surface that detached with the adhesive tape was evaluated. The results are shown in Table 6 below.

Experimental Example 4: Microscratch Test

A light-shielding film having the same thickness on the waveguide plane was subjected to a microscratch test according to the following conditions. A surface of the coating layer was scratched with a Rockwell diamond tip having a tip diameter of 200 μm at a rate of 5000 mN/s while increasing the load from 0 to 10 N. The load at which the surface of the substrate was exposed was measured and was defined as adhesion critical load. The results are shown in Table 6 below.

Conditions of Microscratch test (MST)
Indenter type: Rockwell
Material: Diamond
Radius: 200 um
Force contact: 10 mN
Force speed: 5000 mN/s
Load: 0→10 N

TABLE 6

| | Cross-cut test | Microscratch test |
|---|---|---|
| Example 7 | 5B | 2500 mN |
| Example 8 | 5B | 2500 mN |
| Comparative Example 3 | 5B | 774 mN |
| Comparative Example 4 | 5B | 190 mN |
| Comparative Example 5 | 5B | 1320 mN |

From the results of the Table 6, in the evaluation of the adhesion by the cross-cut test, the compositions of Examples 7 and 8 and Comparative Examples 3 to 5 were all determined to be 5B, and thus it was not possible to compare the superiority of adhesion. In the cross-cut test, there is a limitation that it is impossible to compare and evaluate the adhesive force in the range exceeding the adhesive strength of the tape to be used. Therefore, numerical comparison of adhesion was performed using a microscratch test. As a result, it was found that the adhesion critical force of the light-shielding layer prepared in Examples 7 and 8 was as high as about 2500 mN, but the compositions of Comparative Examples 3 to 5 showed significantly low adhesion.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. An ultraviolet (UV) curable composition for light-shielding a rim side of a waveguide, comprising:
    a colorant, acrylate monomers, a urethane acrylate oligomer, an organosilane, and a photopolymerization initiator,
    wherein the acrylate monomers comprise a monofunctional acrylate monomer, a bifunctional acrylate monomer, and a polyfunctional acrylate monomer,
    wherein the content of the monofunctional acrylate monomer is 5 to 40% by weight and the content of the bifunctional acrylate monomer and the multifunctional monomer is from 10 to 70% by weight, based on the total weight of the composition,
    wherein a weight ratio of the acrylate monomers to the urethane acrylate oligomer is 2:1 to 6:1, and
    wherein, after curing the UV curable composition, adhesion between the cured composition and a glass substrate is 5B or more in accordance with ASTM D3359 standard, and 1500 mN or more in accordance with a microscratch test (MST).

2. The UV curable composition according to claim 1, wherein the composition further comprises at least one selected from the group consisting of a photosensitizer and a surfactant.

3. The UV curable composition according to claim 1, wherein the acrylate monomers comprises at least one selected from the group consisting of tetrahydrofurfuryl acrylate, cyclic trimethylolpropane formal acrylate, bisphenol A epoxy diacrylate, hydroxypivalic neopentyl glycol diacrylate, trimethylolpropane triacrylate, tris(2-hydroxyethyl)isocyanurate triacrylate, pentaerythritol tetraacrylate, 2-hydroxyethyl acrylate and dipentaerythritol hexaacrylate.

4. The UV curable composition according to claim 1, wherein the content of the colorant is 0.1 to 15% by weight based on the total weight of the composition.

5. The UV curable composition according to claim 1, wherein the content of the urethane acrylate oligomer is 0.5 to 30% by weight based on the total weight of the composition.

6. The UV curable composition according to claim 1, wherein the composition is capable of being cured by UV light in a wavelength range of 250 nm to 450 nm.

7. The UV curable composition according to claim 1, wherein the composition is capable of being cured by UV light in a wavelength range of 360 nm to 410 nm.

8. A planar waveguide, comprising:
    a waveguide having a first surface and an opposing second surface separated by a thickness therebetween, where the first and second surfaces extend to a rim side, wherein the rim side extends along the thickness of the waveguide, the rim side having a cut surface; and
    a light-shielding film disposed on the cut surface of the rim side of the waveguide,
    wherein the light-shielding film is prepared by curing the UV curable composition of claim 1,
    wherein the total optical density of the light-shielding film is 1.5 or more, and
    wherein adhesion between the waveguide and the light-shielding film is 5B or more in accordance with ASTM D3359 standard, and 1500 mN or more in accordance with a microscratch test (MST).

9. The planar waveguide according to claim 8, wherein the colorant of the light-shielding film is at least one black ink pigment selected from the group consisting of carbon black, graphite, metal oxide and organic black pigments.

10. The planar waveguide according to claim 8, wherein the content of the black ink pigments is 0.1 to 15% by weight based on the total weight of the light-shielding film.

11. A waveguide module comprising the waveguide according to claim 8.

12. A method of manufacturing a planar waveguide, comprising:
    coating the composition according to claim 1 on a cut surface of a rim side of a waveguide, wherein the waveguide has a first surface and an opposing second surface separated by a thickness therebetween, wherein the first and second surfaces extend to the rim side, wherein the rim side extends along the thickness of the waveguide, the rim side having the cut surface; and
    curing the composition to form the light-shielding film having an optical density (OD) of 1.5 or more.

13. The method according to claim 12, wherein coating the composition further comprises:
    coating the curable ink composition on the cut surface of the rim side of the waveguide using a dispenser process or an inkjet printing method.

14. The method according to claim 12, wherein the curing is UV curing.

15. The method according to claim 12, wherein adhesion between the waveguide and the light-shielding film is 5B or more in accordance with ASTM D3359 standard, and 1500 mN or more in accordance with a microscratch test (MST).

16. The method according to claim 12, wherein the cut surface is a planar surface, a curved surface, or an inclined surface.

17. The method according to claim 12, wherein the light-shielding film is disposed on the first and second surfaces at a periphery thereof.

* * * * *